US012371330B2

(12) United States Patent
Hayner et al.

(10) Patent No.: US 12,371,330 B2
(45) Date of Patent: Jul. 29, 2025

(54) GRAPHENE-BASED ARTIFICIAL GRAPHITE MATERIAL

(71) Applicant: Rivian IP Holdings, LLC, Plymouth, MI (US)

(72) Inventors: Cary Michael Hayner, Naperville, IL (US); Byoungchul You, Saratoga, CA (US); Soo Kim, Fremont, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 294 days.

(21) Appl. No.: 18/145,752

(22) Filed: Dec. 22, 2022

(65) Prior Publication Data

US 2024/0208824 A1 Jun. 27, 2024

(51) Int. Cl.
*C01B 32/205* (2017.01)

(52) U.S. Cl.
CPC ........ *C01B 32/205* (2017.08); *C01P 2006/12* (2013.01); *C01P 2006/40* (2013.01)

(58) Field of Classification Search
CPC . C01B 32/205; C01P 2006/12; C01P 2006/40
USPC ...................................... 423/445 R
See application file for complete search history.

(56) References Cited

FOREIGN PATENT DOCUMENTS

KR 2022053610 A * 4/2022 ............. C01B 32/05

OTHER PUBLICATIONS

Machine Translation of KR 20220053610 A. (Year: 2022).*
Torkelson et al. "Polymer-Graphite Nanocomposites: Effective Dispersion and Major Property Enhancement via Solid-State Shear Pulverization". Macromolecules 2008, 41, 1905-1908. (Year: 2008).*
Wang et al. "Lithium Insertion in Carbon-Silicon Composite Materials Produced by Mechanical Milling". J. Electrochem. Soc., vol. 145, No. 8, Aug. 1998. p. 2751-2758. (Year: 1998).*
Lucia et al. "Induction Heating Technology and Its Applications: Past Developments, Current Technology, and Future Challenges". IEEE Transactions on Industrial Electronics, vol. 61, No. 5, May 2014. p. 2509-2520. (Year: 2014).*
Oka et al. "Effect of amorphous carbon coating on the formation of solid electrolyte interphase and electrochemical properties of a graphite electrode". Journal of Power Sources 543, Jul. 2022, 231850. p. 1-10. (Year: 2022).*

* cited by examiner

*Primary Examiner* — Coris Fung
*Assistant Examiner* — Catriona M Corallo
(74) *Attorney, Agent, or Firm* — BAKERHOSTETLER

(57) ABSTRACT

Provided is a graphite material comprising a plurality of graphite crystals and an electrically-conductive material embedded between the plurality of graphite crystals, and methods of making thereof. Such graphite material can be prepared by integrating a graphite precursor material with a seed material, which can be selected from graphene, carbon nanotubes, silicon-containing material, or a combination thereof, to form a graphite precursor composite; and graphitizing the graphite precursor composite to form the graphite material.

12 Claims, 15 Drawing Sheets

GRAPHENE-BASED ARTIFICIAL GRAPHITE MATERIAL

INTRODUCTION

The present disclosure generally relates to graphite, and more particularly, to graphene-seeded artificial graphite.

SUMMARY

Provided herein is graphite material and methods of making graphite material. The graphite material described herein can be used to manufacture negative electrodes for rechargeable batteries (e.g., lithium-ion batteries). Also provided herein are electric vehicle systems comprising rechargeable batteries.

Artificial graphite requires significant levels of energy input, high temperatures) (>2,400° C.), and a considerable amount of time to manufacture. Conversely, the graphite material described herein requires less energy input, lower temperatures, and/or less time to manufacture. Specifically, the graphite material described herein is produced by adding graphene, carbon nanotubes (CNT), or a combination thereof, into pitch precursor material to promote the growth of graphitic regions. The addition of the graphene and/or CNT can improve the graphitization process by enabling induction heating (or pre-heating) and the ability to process at lower temperatures and/or durations. In some embodiments, silicon may be integrated to increase performance characteristics.

Also described herein is graphite material coated with a carbon-containing coating. In some embodiments, the carbon-containing coating comprises only a carbon material. In some embodiments, the carbon-containing coating comprises a carbon material and/or an SEI (solid electrolyte interphase) component. In some embodiments, the coating on the graphite material may be a single layer. In some embodiments, the coating on the graphite material comprises two separate layers. In some embodiments, the carbon-containing coating can help prevent the formation of lithium dendrites.

In some embodiments, provided is a graphite material comprising: a plurality of graphite crystals; and an electrically conductive material embedded with the plurality of graphite crystals.

In some embodiments of the graphite material, the graphite material comprises a silicon-containing material embedded with the plurality of graphite crystals.

In some embodiments of the graphite material, the electrically conductive material at least partially coats the silicon-containing material.

In some embodiments of the graphite material, there is a void space between the silicon-containing material and the electrically conductive material.

In some embodiments of the graphite material, the electrically conductive material comprises at least one selected from the group of graphene, carbon nanotubes, or nanographite.

In some embodiments of the graphite material, the graphite material has a graphitization degree of at least 80%.

In some embodiments of the graphite material, the graphite material has a I(110)/I(004) greater than 0.2.

In some embodiments of the graphite material, the graphite material has a specific surface area of less than 10 m2/g.

In some embodiments of the graphite material, the graphite material comprises a first coating layer on the graphite material, wherein the first coating layer comprises a carbon material.

In some embodiments of the graphite material, the graphite material comprises a second coating layer on the graphite material, wherein the second coating layer comprises at least one selected from the group of a solid-electrolyte interface (SEI) former, a MAX component, or a lithiophilic compound.

In some embodiments of the graphite material, the SEI former is at least one selected from the group consisting of LiF, $Li_2O$, or Li2CO3, the MAX component is a transition metal dissolution scavenger, and the lithiophilic compound is at least one selected from the group consisting of Au, Ag, Zn, Sn, Si, or Ge.

In some embodiments of the graphite material, the graphite material comprises a second coating layer on the first coating layer, wherein the second coating layer comprises at least one selected from the group consisting of an electrically conductive material, a solid-electrolyte interface (SEI) former, a MAX component, or a lithiophilic compound.

In some embodiments, provided is a method comprising: integrating an electrically conductive material into a graphite precursor material to form a graphite precursor composite; and graphitizing the graphite precursor composite to form a graphite comprising the electrically conductive material.

In some embodiments of the method, integrating the electrically conductive material into the graphite precursor material comprises exfoliating and dispersing the electrically-conductive material into the graphite precursor material.

In some embodiments of the method, exfoliating and dispersing comprises solid-state shear or twin-screw shear pulverization of the electrically conductive material and the graphite precursor material.

In some embodiments of the method, the method comprises integrating a silicon-containing material into the graphite precursor material to form the graphite precursor composite.

In some embodiments of the method, graphitizing the graphite precursor composite is in an inductive furnace.

In some embodiments of the method, the method comprises coating the graphite with a first coating comprising a carbon material.

In some embodiments of the method, the first coating further comprises at least one selected from the group consisting of an electrically conductive material, a solid-electrolyte interface (SEI) former, a MAX component, or a lithiophilic compound.

In some embodiments of the method, the method comprises coating the graphite with a second coating comprising at least one selected from the group consisting of an electrically conductive material, a solid-electrolyte interface (SEI) former, a MAX component, or a lithiophilic compound.

The embodiments disclosed above are only examples, and the scope of this disclosure is not limited to them. Particular embodiments may include all, some, or none of the components, elements, features, functions, operations, or steps of the embodiments disclosed above. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE FIGURES

In the Figures, like reference numerals refer to like components unless otherwise stated herein.

DETAILED DESCRIPTION

Provided herein is graphite material, negative anodes comprising the graphite material, rechargeable batteries comprising the graphite material (e.g., lithium-ion batteries), and electric vehicle systems comprising said rechargeable batteries. Also described herein are methods of producing the graphite material.

Conventional graphite production methods require significant levels of energy input, high temperatures (>2400° C.), and a considerable amount of time to manufacture. The artificial graphite described herein can be produced using methods that require lower amounts of energy, lower temperatures, and/or less time. Specifically, the artificial graphite described herein can be produced by adding graphene and/or carbon nanotubes (CNT) into pitch precursor material to promote the growth of graphitic regions. The addition of the graphene and/or CNT can improve the heat-temperature process by enabling induction heating (or pre-heating) and the ability to process at lower temperatures and/or durations.

Graphene-Seeded Graphite

Described below are various embodiments of graphene-seeded graphite. In some embodiments, graphene only is seeded into the graphite. In some embodiments, silicon is seeded into the graphite along with the graphene. Although the graphite material is described as graphene-seeded, in some embodiments, carbon nanotubes or nano-graphite can be seeded into the graphite material. In some embodiments, the artificial graphite described herein is seeded with graphene, carbon nanotubes, nano-graphite, or a combination thereof. In some embodiments, the seeded material is electrically conductive.

Figure 1:
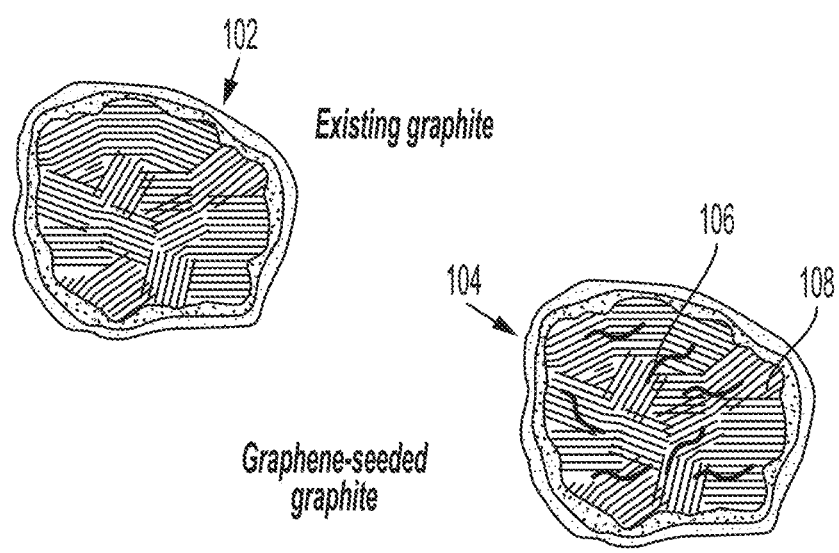
FIG. 1 shows unmodified graphite and graphene-seeded graphite, according to some embodiments.

FIG. 1 shows unmodified graphite 102 and graphene-seeded graphite 104, according to some embodiments. Specifically, the image on the left shows conventional, unmodified graphite 102. The image on the right shows graphene-seeded graphite 104 (e.g., artificial graphite). As shown, the graphene 106 is embedded between the graphite crystals 108.

Figure 2A:
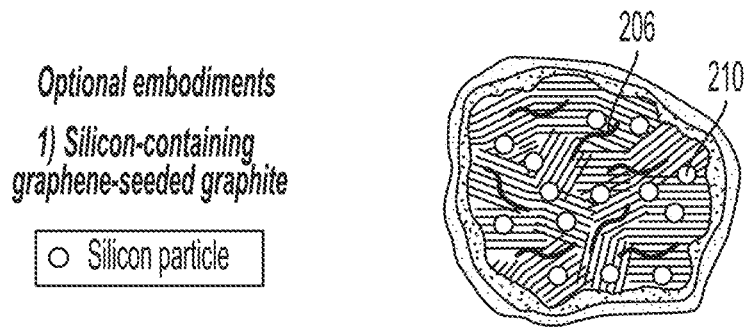
FIG. 2A shows silicon-containing graphene-seeded graphite, according to some embodiments.
Figure 2B:
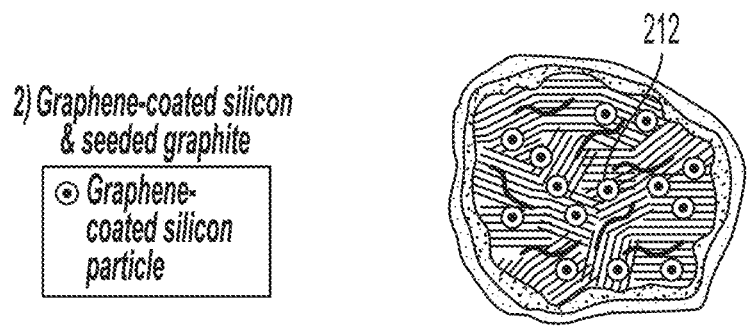
FIG. 2B shows graphene-coated silicon and graphene-seeded graphite, according to some embodiments.
Figure 2C:
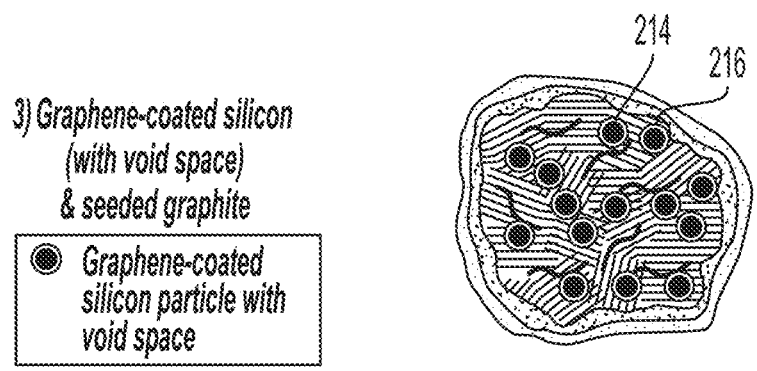
FIG. 2C shows graphene-coated silicon with void space and graphene-seeded graphite, according to some embodiments.

FIGS. 2A-2C show various embodiments of the artificial graphite described herein. For example, FIG. 2A shows silicon-containing graphene-seeded graphite, according to some embodiments. As shown, both silicon 210 and graphene 206 are embedded between the graphite crystals. FIG. 2B shows graphene-coated silicon 212 and seeded graphite, according to some embodiments. In this image, graphene-coated silicon particles are shown embedded between graphite crystals. In some embodiments, the carbon material (e.g., graphene) at least partially coats the silicon particles. In some embodiments, the carbon material (e.g., graphene) fully coats the silicon particles. FIG. 2C shows graphene-coated silicon with void space 214 and seeded graphite, according to some embodiments. The void space located between the silicon particle and graphene coating is identified by item 216. Here, graphene-coated silicon particles with a void space are embedded between the graphite crystals.

In some embodiments, the graphite crystals of the artificial graphite described herein will at least partially grow outward from the electrically conductive material (e.g. graphene). The graphite crystals may envelop the conductive material within a single graphite crystal such that the electrically conductive material may be located within a particular crystal with the crystal encompassing/surrounding the electrically-conductive material. In some embodiments, the graphite crystals may grow multiple fragmented crystals from the electrically conductive material. In such cases, the electrically conductive material may be located at the intersection/edge of multiple graphite crystals that grow in different directions from the seed. Therefore, the electrically conductive material may be within an individual graphite crystal, or may be at the interface between different graphite crystals.

In some embodiments, the graphite material described herein has a specific surface area of 0.1-10 $m^2/g$, 1-5 $m^2/g$, or less than 3 $m^2/g$. In some embodiments, the graphite material described herein has a specific surface area of less than or equal to 10, 9, 8, 7, 6, 5, 4, 3, 2, or 1 $m^2/g$. In some embodiments, the graphite material described herein has a specific surface area of greater than or equal to 0.1, 1, 2, 3, 4, 5, 6, 7, 8, or 9 $m^2/g$. Specific surface area is defined as the total surface area of a material per unit of mass.

Methods for Producing Artificial Graphite

The methods for producing artificial graphite described herein have numerous benefits over existing processes. Embedding conductive carbon (e.g., graphene layers or "seeds" into needle coke (e.g., the precursor to artificial graphite) can improve thermal conductivity of precursor material. The improved thermal conductivity can improve crystal growth uniformity during the graphitization process. The processes and methods described herein can also be more energy efficient (as explained in detail below) due to more efficient heat transfer. More efficient heat transfer can lead to reduced processing time, which can thereby increase energy savings.

Graphene-seeded coke materials can also enable unique architectures that are otherwise difficult or impossible to produce (e.g., embodiments that include silicon, such as graphene-coated silicon). In these embodiments, the graphene coating can provide a protective barrier layer that reduces silicon carbide (SiC) formation from silicon and needle coke reactions at the high temperatures typically required during the graphitization process.

The processes and methods described herein further allow control of the graphene orientation within the coke granule/sub-granule. Controlling this orientation can lead to more isotropic graphite grain growth, which can thereby lead to graphite with reduced swelling, improved rate of charging, and faster charge performance for lithium-ion batteries.

In some embodiments, "seeding" may also be referred to as "templating."

Figure 3:
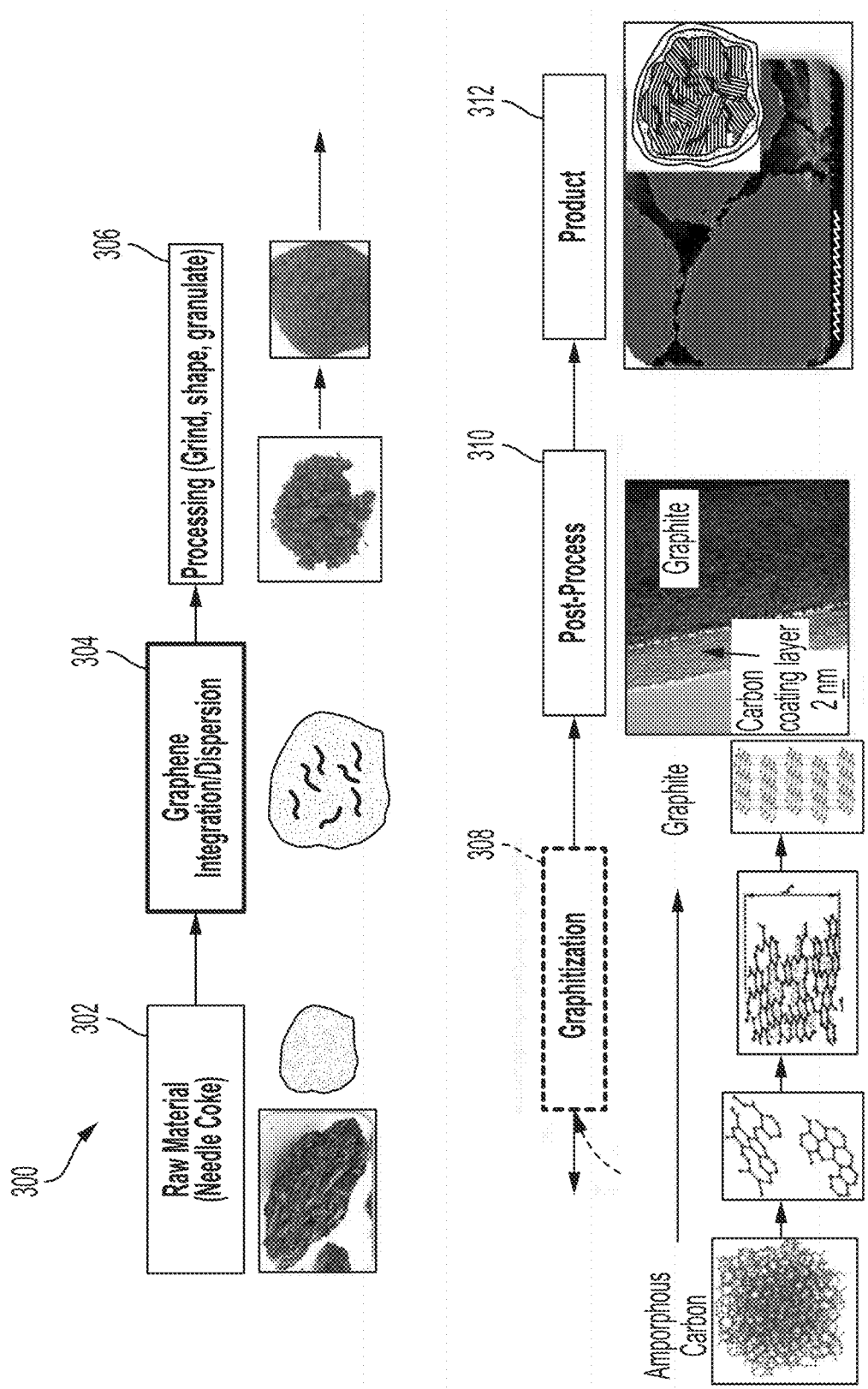
FIG. 3 shows a process for producing artificial graphite, according to some embodiments.

FIG. 3 shows a process 300 for producing artificial graphite, according to some embodiments. Raw material 302 may be prepared by exfoliating and/or shearing graphite into pre-made needle coke materials. In some embodiments, the raw material 302 can comprise needle coke, petroleum coke, petroleum residue, coal-tar pitch, polyacrylonitrile, or combinations thereof. In some embodiments, raw material 302 comprises needle coke.

At step 304, the graphene is embedded into the raw material 302. In some embodiments, a combination of the raw material 302 and graphite is exfoliated and dispersed to form the graphene-seeded coke. In some embodiments, a solid-state shear pulverization process is used to form graphene-seeded coke from a combination of the raw material 302 and graphite. In some embodiments, a twin-screw shear pulverization process is used to form graphene-seeded coke from a combination of the raw material 302 and graphite. In this example, any residual graphite may be removed after the twin-screw shear pulverization process.

In some embodiments, graphene is dispersed into pre-made needle coke materials at step 304. Specifically, a combination of raw material 302 (e.g., coke) and graphene may be dispersed to form graphene-seeded coke. In some embodiments, a solid-state shear pulverization process is used to form graphene-seeded coke from a combination of the raw material 302 and graphene. In some embodiments, a twin-screw shear pulverization process is used to form graphene-seeded coke from a combination of the raw material 302 and graphene. In this example, any residual graphite may be removed after the twin-screw shear pulverization process.

In some embodiments, graphite is exfoliated and/or sheared into an upstream needle coke precursor that is further processed into needle coke at step 304. For example, shear exfoliation may be used on a combination of coke precursor (decant oil) and graphite. The exfoliated product may then be refined to form graphene-seeded coke.

In some embodiments, graphene is dispersed into upstream needle coke precursor that is further processed into needle coke at step 304. For example, a dispersion process may be used on a combination of coke precursor (decant oil) and graphene. The dispersed product may be refined to form graphene-seeded coke.

At step 306, the graphene-seeded coke from step 304 is further processed using a grinding process, a shaping process, a granulation process, or combinations thereof.

Figure 4A:
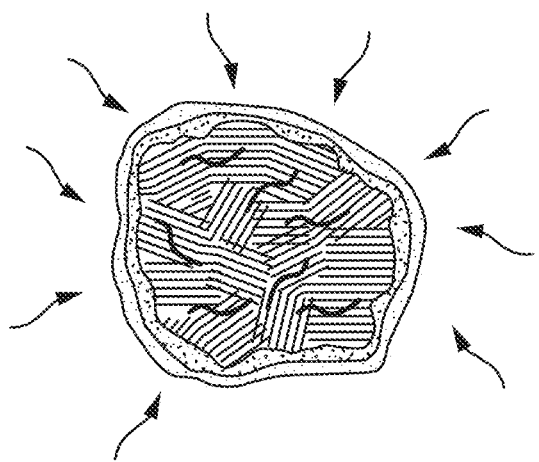
FIG. 4A shows heat flow of a conventional production process, according to some embodiments.

At step 308, graphitization, the process of heating amorphous carbon for a prolonged period of time, rearranging the atomic structure to achieve an ordered crystalline structure, is used on the processed graphene-seeded coke. Conventionally, an Acheson-style heating process is used, as depicted in FIG. 4A. However, an Acheson-style process has various drawbacks, as described below in reference to FIG. 4A. In the currently disclosed process, an induction-style heating process may be used, as depicted and further described with respect to FIG. 4B. A graphitization degree is the percentage transformation to a graphite material compared to the entire carbon material. In some embodiments, the graphite material described herein has a graphitization degree of at least 85% (i.e., 85% graphite and 15% other forms of carbon). In some embodiments, the graphitization degree of the graphite material described herein may be 80-99%. In some embodiments, the graphitization degree of the graphite material described herein may be less than or equal to 99, 98, 97, 96, 95, 94, 93, 92, 91, 90, 89, 88, 87, 86, 85, 84, 83, 82, or 81%. In some embodiments, the graphitization degree of the graphite material described herein may be greater than or equal to 80, 81, 82, 83, 84, 85, 86, 87, 88, 89, 90, 91, 92, 93, 94, 95, 96, 97, or 98%.

$I(110)/I(004)$ is a metric is related to the orientation of the graphite crystals within the particle. The larger the value, the lower the crystal orientation within the particle (and therefore better expected power performance). In some embodiments, the $I(110)/I(004)$ value is 0.15-0.8 or less than 0.2. In some embodiments, the $I(110)/I(004)$ is less than or equal to 0.8, 0.7, 0.6, 0.5, 0.4, 0.3, 0.2, or 01. In some embodiments, the I(110)/I(004) is greater than or equal to 0.15, 0.5, 0.1, 0.2, 0.3, 0.4, 0.5, 0.6, 0.7, or 0.8.

At step 310, any necessary post-processing is completed to form final product 312 (e.g., graphene-seeded coke). Post-processing that may be utilized can include, but is not limited to, applying carbon surface coatings (including graphene-containing carbon coatings), applying other, non-carbon coatings (e.g., MAX phase materials to trap manganese dissolution, metal coatings, metal oxide coatings), additional thermal processing steps to assist coating performance, milling to reduce agglomerates from the graphitization process, and/or sieving/classification to remove large particles from the final product.

As mentioned above, FIG. 4A shows heat flow of a conventional Acheson-style graphitization process, according to some embodiments. As shown, heat enters the particles from an external source and diffuses inward. The outer shell of the particles heats up first. The core of the particles eventually reaches the desired temperature over time. However, the final product is completely and uniformly heated, as it is not possible to selectively heat portions of a particle. This process causes inefficient energy use, since excess heat is lost to the surrounding environment.

Figure 4B:
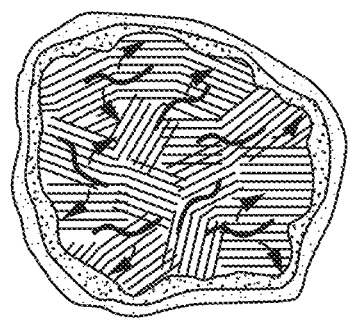
FIG. 4B shows heat flow of an induction-style production process, according to some embodiments.

FIG. 4B shows heat flow of an induction-style production process, according to some embodiments. In some embodiments, the methods described herein use an induction-style heating process. During an induction-style heating process, heat is generated by electrically conductive material within the particles (e.g., graphene) and diffuses away from this electrically conductive material. This "localized" heating can enable tailored heating profiles. For example, tailored heating profiles may be desirable in the event there is a temperature-sensitive component embedded in the structure. Thus, induction-style heating allows for unique materials (e.g., materials containing temperature-sensitive components) to be used. Induction-style heating is also more energy efficient than Acheson-style heating.

Figure 5A:
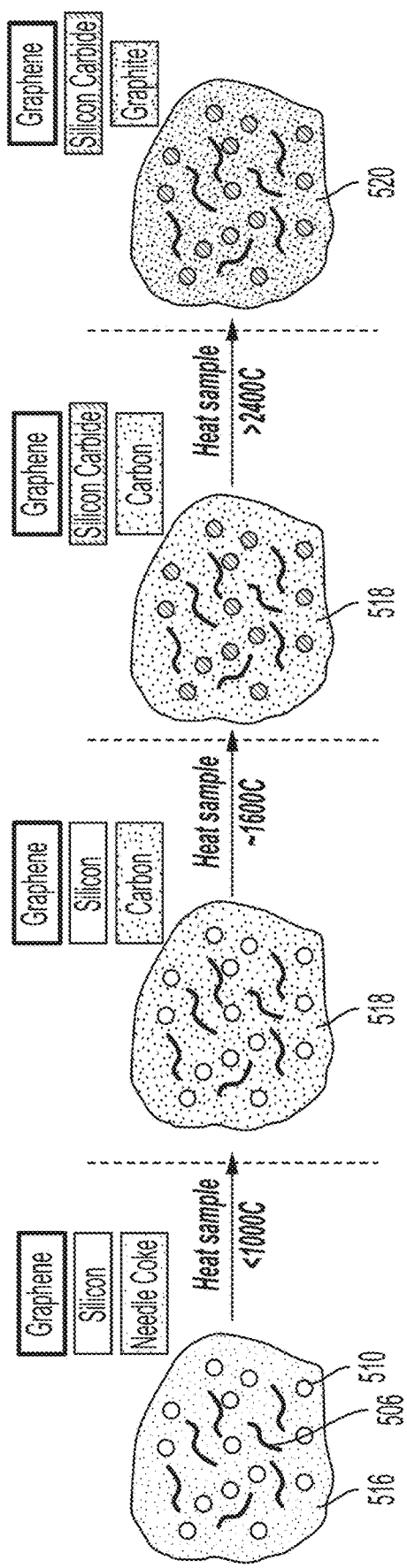
FIG. 5A shows an Acheson process for producing artificial graphite, according to some embodiments.

FIG. 5A shows an Acheson process for producing artificial graphite, according to some embodiments. Specifically, FIG. 5 shows what would result for a silicon-carbon composite material when attempting to produce an active silicon-containing artificial graphite by the Acheson process. Graphene 506, silicon 510, needle coke 516, carbon 518, and graphite 520 are shown throughout the process. As shown, silicon-embedded graphene-seeded needle coke is heated (<1,000° C.), during which the needle coke is carbonized to form amorphous carbon. This amorphous carbon is then heated (~1,600° C.), during which the silicon reacts with carbon to create silicon carbide, which is an undesirable product. At this step in the process, the silicon is also inactivated. Finally, the material is heated (>2,400° C.) to form graphitic carbon with inactive silicon, an undesirable product. The graphitic carbon is formed when the amorphous carbon rearranges.

Figure 5B:
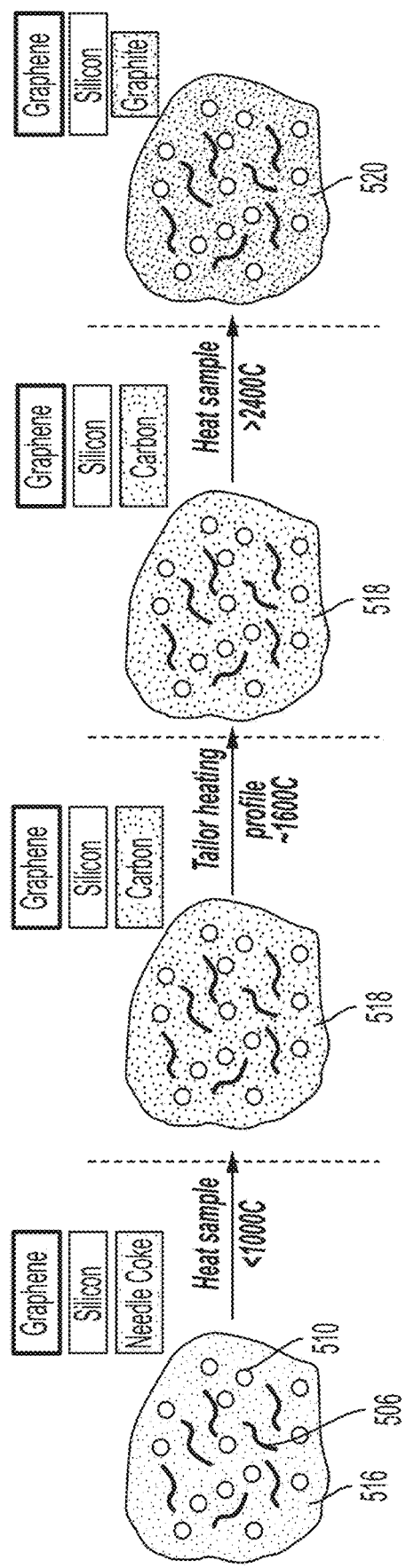
FIG. 5B shows an induction process for producing artificial graphite, according to some embodiments.

FIG. 5B shows an induction process for producing artificial graphite, according to some embodiments. Graphene 506, silicon 510, needle coke 516, carbon 518, and graphite 520 are shown throughout the process. Unlike the Acheson-style heating process show in FIG. 5A, the induction-style heating process depicted in FIG. 5B yields a desirable product. As shown, silicon-embedded graphene-seeded needle coke is heated (<1,000° C.), during which the needle coke is carbonized to form amorphous carbon. This amorphous is then tailor heated (~1,600° C.), during which carbon is selectively heated using a controlled temperature profile to minimize silicon carbide formation. During this heating step, silicon remains active (i.e., there is little or no reaction between the silicon and carbon). Finally, the material is heated (>2,400° C.) further using a tailored heating profile, enabling the amorphous carbon to rearrange into graphitic carbon, wherein the silicon remains active.

Carbon-Containing Coatings

In some embodiments, the artificial graphite described herein may additionally include a carbon-containing coating. In some embodiments, the artificial graphite may comprise a single-layer coating. In some embodiments, the artificial graphite may comprise a double-layer coating. In some embodiments, the carbon-containing coating can additionally comprise an SEI component.

Figure 6A:
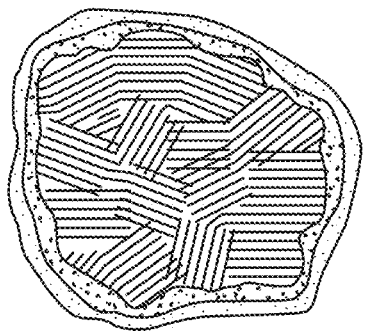
FIG. 6A shows graphite having a carbon coating, according to some embodiments.

FIG. 6A shows graphite having a carbon coating 630, according to some embodiments. As shown, there is no graphene or other additive in this graphite.

Figure 6B:
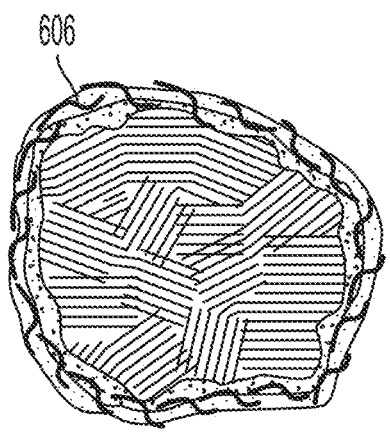
FIG. 6B shows graphene-coated graphite, according to some embodiments.

FIG. 6B shows graphene-coated graphite, according to some embodiments. In this embodiment, the artificial graphite includes a single carbon-containing (e.g., graphene) coating layer 606. Specifically, FIG. 6B shows the results of a one-step coating process. A graphene/carbon material has been applied to the surface of the graphite as a single step using a (carbon precursor+graphene) blended material. This results in a single, carbon/graphene integrated coating on the surface.

Figure 6C:
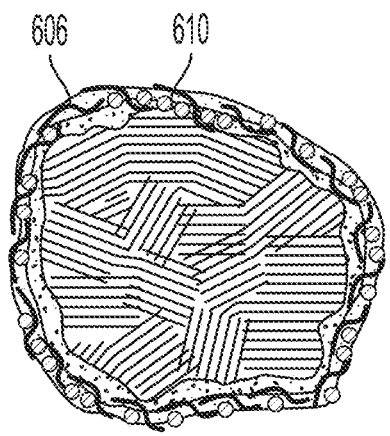
FIG. 6C shows coated graphite, the coating comprising an SEI component and graphene pre-mixed with a carbon precursor, according to some embodiments.

FIG. 6C shows coated graphite, the coating comprising an additive component 610 and graphene 606 pre-mixed with a carbon source (e.g. pitch), according to some embodiments. Here, the artificial graphite comprises a single coating layer that comprises an additive component 610 and graphene 606. These two materials are pre-mixed with a carbon source (e.g. pitch) prior to coating the artificial graphite. In some embodiments, the additive component 610 comprises an electrically conductive material, a solid-electrolyte interface (SEI) former, a MAX component, a lithiophilic compound, or a combination thereof. In some embodiments, an SEI former comprises LiF, $Li_2O$, $Li_2CO_3$, or a combination thereof.

A MAX component is a $M_{n+1}AX_n$ material for lithium-ion batteries comprising a compound of formula $M_{n+1}AX_n$, where M is an early transition metal atom, n is an integer from 1 to 3, A is group 13 or group 14 element, and X is C or N. In some embodiments, M is Cr, Ti, or Zr. In some embodiments, A is Al or Si, and X is C. In some embodiments, n is 1 or 2. In some embodiments, the compound is $Cr_2AlC$, $Ti_3SiC_2$ or $Zr_2AlC$. In some embodiments, the compound is $V_2AlC$ or $Ti_3AlC_2$. In some embodiments, the compound is $Nb_2AlC$, $Nb_3AlC_2$. $Nb_4AlC_3$, or $V_4AlC_3$. $M_{n+1}AX_n$ materials (at anode, electrolyte or potentially even at cathode) can decrease or prevent manganese dissolution in the liquid electrolyte of lithium-ion batteries which can be an issue for when the cathode comprises a manganese containing cathode active material like LMFP, LMO, $LiMO_2$, $Li_{1+x}M_{1-x}O_2$, and $Li_2MnO_3$. Manganese (Mn) can an improve the capacity, rechargeability, safety, and longevity of the battery, for example as LMFP cathode active material compared to LFP cathode active material. However, Manganese ions can tend to dissolve in the liquid electrolyte used in lithium-ion batteries. Manganese dissolution in lithium-ion batteries can trigger capacity loss and structural changes that reduce the longevity of the battery. MAX additive materials that can prevent or decrease Manganese ion dissolution during the chemical reactions that occur during charge/discharge cycles to produce electrical energy. MAX materials can exhibit thermodynamic stability and as such are less prone to dissolution. A lithium-ion battery incorporating MAX compound(s) can exhibit less or no Manganese dissolution, and thus exhibit improved capacity relative to a lithium-ion battery without the MAX compound(s) In some embodiments, the MAX component comprises a transition metal dissolution scavenger.

In some embodiments, the lithiophilic compound can include carbon-type materials, metal or metal alloy materials, or polymeric materials. Examples of carbon-type materials include, but are not limited to, multi-walled carbon nanotubes having defects, boron-doped graphene, nitrogen-doped graphene, a metal nanoparticle graphene cage (e.g., a gold-graphene cage), zinc oxide-coated carbon nanotubes, $F_3N$/N-doped graphene, Ag/N-doped carbon macroporous fiber, Co/Co$_x$N/N-doped carbon, MOF-derived ZnO/N-doped carbon sheet, PVDF coated hollow carbon, SnS$_2$/carbon fiber, Mo$_2$N/Carbon nanofiber, TiC/C core-shell, and MXene (few-atoms-thick layers of transition metal carbides, nitrides, or carbonitrides). A graphene cage can comprise metallic nanoparticles, for example, gold nanoparticles. Lithium can be preferentially deposited inside the graphene cage at gold nanoparticles. Examples of metal or metal alloy materials include, but are not limited to, silver, gold, copper oxide, bismuth-nanosheet, copper-copper oxide-nickel alloy, copper-lithium oxide alloy, antimony-lithium alloy, aluminum-lithium alloy, zinc-lithium alloy, Li$_{15}$Au$_4$, LiZn, manganese-doped Li—LiB, and silver-incorporated metal-organic framework. Examples of polymeric materials include, but are not limited to, framework porphyrin, LiPON, PVDF-PAN, and polydopamine (PDA).

Figure 6D:
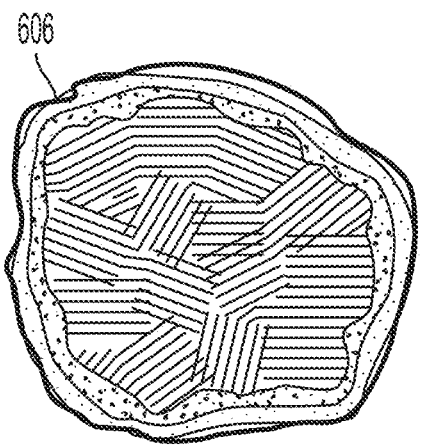
FIG. 6D shows graphite having a two-layer coating with a first carbon layer and a second graphene layer, according to some embodiments.

FIG. 6D shows a graphene-coated graphite, according to some embodiments. Specifically, FIG. 6D shows the results of a two-step coating process. A first a traditional carbon-material coating (often pitch or other form of coke) applied to the graphite surface as the first step (coating 610), and then is followed by a secondary coating 606 of graphene on top of the carbon-material coating. This results in two separate coatings on the graphite surface.

Figure 6E:
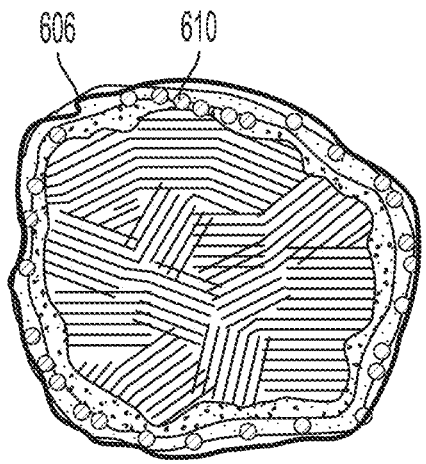
FIG. 6E shows graphite having a two-layer coating with a first SEI component layer and a second graphene layer, according to some embodiments.

FIG. 6E shows graphite having a two-layer coating with a first SEI component layer and a second graphene layer, according to some embodiments. As shown, the artificial graphite includes a first coating layer and a second coating layer. The first coating layer comprises an additive component. The second coating layer comprises carbon (e.g., graphene).

Figure 7A:
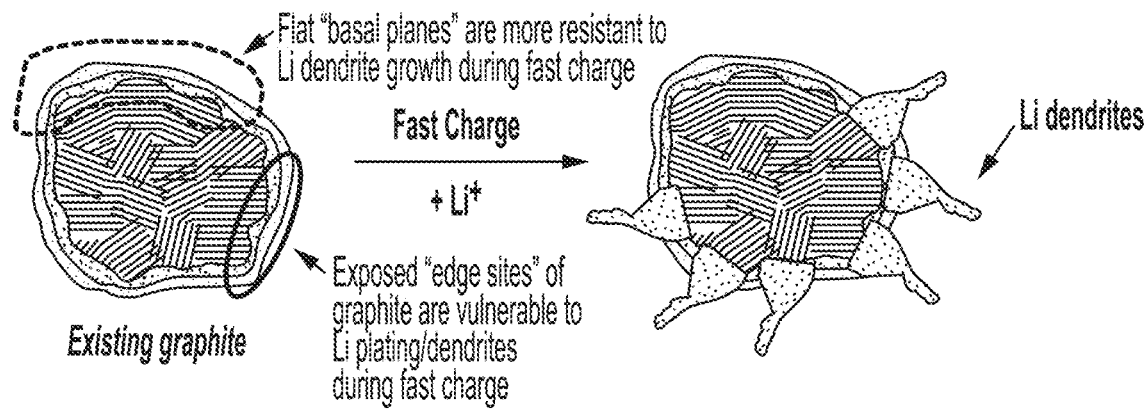
FIG. 7A shows lithium dendrite growth on conventional (unmodified) graphite, according to some embodiments.
Figure 7B:
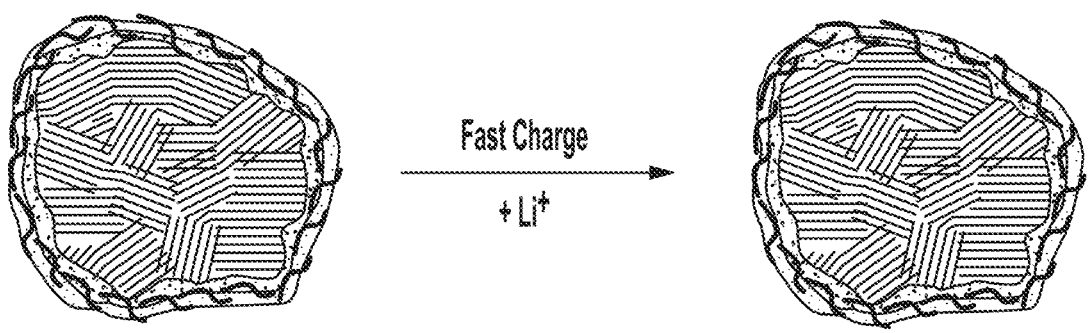
FIG. 7B shows the absence of lithium dendrite growth on artificial graphite, according to some embodiments.

FIGS. 7A and 7B demonstrate the benefits of including a carbon-containing coating on the artificial graphite. Specifically, FIG. 7A shows lithium dendrite growth on conventional (unmodified) graphite, according to some embodiments. Flat "basal planes" are more resistant to lithium dendrite growth during fast battery charging processes. However, exposed "edge sites" of graphite are vulnerable to lithium plating/dendrite growth during fast battery charging processes. FIG. 7B, on the other hand, shows the absence of lithium dendrite growth on artificial graphite, according to some embodiments. The graphene-containing coating on the artificial graphite protects the graphite, and in particular, the exposed "edge sites" from lithium plating/dendrite growth by reducing the accessible "edge sites" of the underlying graphite.

EXAMPLES

Example 1: One gram of graphene powder is dispersed in 2280 g xylene using a rotor-stator mixer. 120 grams of coal tar pitch is added to the dispersion and mixed to dissolve. Subsequently, the solution is heated while mixing and xylene and other volatile components are evaporated leaving behind a graphene-containing pitch material. The material is then treated through a delayed coking process and results in a graphene-containing coke (G-CC) material. The G-CC material is then milled, calcined, and processed in an Acheson furnace at 2800 degrees C.

Example 2: Natural flake graphite and petroleum coke are blended together at a predetermined weight ratio of 1:100, or 100 grams of natural flake graphite and 10.0 kilograms of petroleum coke. To adequately blend the two materials together, the two components are blended together by simple blending or dry milling. After blending materials together, the composite blend is then processed through a twin screw extruder to disperse graphene. The material may be recycled or repeated through the exfoliation process as necessary. Graphite exfoliation is monitored using x-ray diffraction. Afterwards, the material is then calcined and milled, and results in a calcined petroleum coke (CPC-G) material containing exfoliated graphite (e.g. graphene). The CPC-G material is then processed in an Acheson furnace at 3000 degrees C.

Example 3: Graphene powder and petroleum residue are blended together at a predetermined weight ratio of 1:150, or 80 grams of graphene powder and 12.0 kilograms of petroleum residue. After blending materials together, the composite is processed through a temperature-controlled twin screw extruder to disperse graphene. The twin-screw extruder operating temperature is controlled to ensure the petroleum residue does not soften or melt during operation. Afterwards, the material is then treated through a delayed coking process and results in a graphene-containing petroleum coke (G-PC) material. The G-PC material is then calcined, milled, and processed in an Acheson furnace at 2700 degrees C.

Example 4: Supplementary anode active material such as silicon can be added to the graphene-seeded graphite during synthesis. For example, 10 grams of graphene is dispersed in 900 grams of toluene using a rotor-stator mixer. Then, 90 grams of silicon nanoparticles (20 nm) are mixed into the graphene dispersion. The toluene dispersion containing silicon and graphene is then spray-dried to form graphene-encapsulated silicon nanoparticles. 100 grams of graphene-encapsulated silicon nanoparticles are then added to a vessel containing 2250 grams of decant oil and 45 kg xylene. The vessel is mixed until the decant oil has dissolved and the graphene-encapsulated silicon nanoparticles are well mixed. The vessel is heated while mixing and xylene and other volatile components are evaporated leaving behind a residual decant oil composite embedded with graphene-encapsulated silicon nanoparticles. The composite is then treated through a delayed coking process and results in a silicon-containing petroleum coke (SIG-CPC) material. The SIG-CPC material is then calcined, milled, and processed in an Acheson furnace at 2500 degrees C. to create the silicon-embedded graphene-seeded graphite material.

Battery Cells, Battery Modules, Battery Packs, and Electric Vehicle Systems

The graphene-seeded graphite material described above can be used in the fabrication of negative electrodes, battery cells, rechargeable metal-ion batteries (e.g., lithium, sodium, potassium, aluminum, magnesium), and electric vehicle systems. More specifically, the graphene-seeded graphite material described herein may be used in the fabrication of battery cells that can be used to form battery modules, and/or battery packs. Battery cells, battery modules, and/or battery packs comprising graphene-seeded graphite material described herein may then be used as a power source in electric vehicles. These embodiments are described in detail below.

Reference will now be made to implementations and embodiments of various aspects and variations of battery cells, battery modules, battery packs, and the methods of making such battery cells, battery modules, and battery packs. Although several exemplary variations of the battery cells, modules, packs, and methods of making them are described herein, other variations of the battery cells, modules, packs and methods may include aspects of the battery cells, modules, packs and methods described herein combined in any suitable manner having combinations of all or some of the aspects described. In addition, any part of or any of the electrodes, densified electrodes, components, systems, methods, apparatuses, devices, compositions, etc. described herein can be implemented into the battery cells, battery modules, battery packs, and methods of making these battery cells, battery modules, and battery packs.

Figure 8:
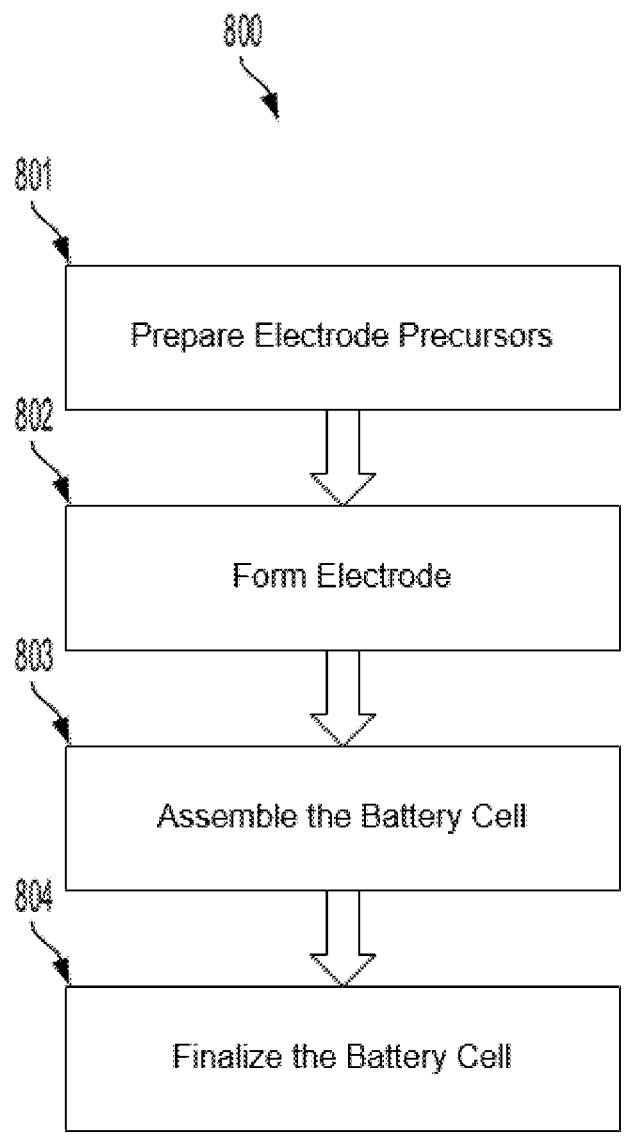
FIG. 8 illustrates a flow chart for a typical battery cell manufacturing process, according to some embodiments.

FIG. 8 illustrates a flow chart for a typical battery cell manufacturing process 800. These steps are not exhaustive and other battery cell manufacturing processes can include additional steps or only a subset of these steps. At step 801, the electrode precursors (e.g., binder, active material, conductive carbon additive) can be prepared. In some embodiments, this step can include mixing electrode materials (e.g., active materials) with additional components (e.g., binders, solvents, conductive additives, etc.) to form an electrode slurry. In some embodiment, this step can include synthesizing the electrode materials themselves.

At step 802, the electrode can be formed. In some embodiments, this step can include coating an electrode slurry on a current collector. In some embodiments, the electrode or electrode layer can include electrode active materials, conductive carbon material, binders, and/or other additives.

In some embodiments, the electrode active materials can include cathode active materials. In some embodiments, the cathode active materials can include olivine or phosphate-based cathode active materials. In some embodiments, the cathode active materials can include over-lithiated-oxide material (OLO), nickel-based cathode materials (e.g., nickel manganese cobalt (NMC) such as NMC111, NMC523, NMC622, NMC811, NMCA, nickel cobalt aluminum oxide (NCA), and Ni90+). In some embodiments, the cathode active materials can include high-nickel content (greater than or equal to about 80% Ni) lithium transition metal oxide. Such lithium transition metal oxides can include a particulate lithium nickel manganese cobalt oxide ("LiNMC"), lithium nickel cobalt aluminum oxide ("LiNCA"), lithium nickel manganese cobalt aluminum oxide ("LiNMCA"), lithium cobalt oxide (LCO), lithium manganese oxide (LMO), lithium metal phosphates like lithium iron phosphate ("LFP"), lithium iron manganese phosphate ("LMFP"), sulfur containing cathode materials, lithium sulfide ($Li_2S$), lithium polysulfides, titanium disulfide ($TiS_2O$), and combinations thereof.

In some embodiments, the electrode active materials can include anode active materials. In some embodiments, the anode active materials can include graphitic carbon (e.g., ordered or disordered carbon with sp2 hybridization, artificial or natural Graphite, or blended), Li metal anode, silicon-based anode (e.g., silicon-based carbon composite anode, silicon metal, oxide, carbide, pre-lithiated), silicon-based carbon composite anode, lithium alloys (e.g., Li—Mg, Li—Al, Li—Ag alloy), lithium titanate, or combinations thereof. In some embodiments, an anode material can be formed within a current collector material. For example, an electrode can include a current collector (e.g., a copper foil) with an in situ-formed anode (e.g., Li metal) on a surface of the current collector facing the separator or solid-state electrolyte. In such examples, the assembled cell may not comprise an anode active material in an uncharged state.

In some embodiments, the conductive carbon material can include graphite, carbon black, carbon nanotubes, Super P carbon black material, Ketjen Black, Acetylene Black, SWCNT, MWCNT, carbon nanofiber, graphene, and combinations thereof.

In some embodiments, the binders can include polymeric materials such as polyvinylidenefluoride ("PVDF"), polyvinylpyrrolidone ("PVP"), styrene-butadiene or styrene-butadiene rubber ("SBR"), polytetrafluoroethylene ("PTFE"), carboxymethylcellulose ("CMC"), agar-agar, alginate, amylose, Arabic gum, carrageenan, caseine, chitosan, cyclodextrines (carbonyl-beta), ethylene propylene diene monomer (EPDM) rubber, gelatine, gellan gum, guar gum, karaya gum, cellulose (natural), pectine, poly(3,4-ethylenedioxythiophene) polystyrene sulfonate (PEDOT-PSS), polyacrylic acid (PAA), poly(methyl acrylate) (PMA), poly(vinyl alcohol) (PVA), poly (vinyl acetate) (PVAc), polyacrylonitrile (PAN), polyisoprene (PIpr), polyaniline (PANi), polyethylene (PE), polyimide (PI), polystyrene (PS), polyurethane (PU), polyvinyl butyral (PVB), polyvinyl pyrrolidone (PVP), starch, styrene butadiene rubber (SBR), tara gum, tragacanth gum, fluorine acrylate (TRD202A), xanthan gum, or combinations thereof.

After coating, the coated current collector can be dried to evaporate any solvent. In some embodiments, this step can include calendaring the coated current collectors. Calendaring can adjust the physical properties (e.g., bonding, conductivity, density, porosity, etc.) of the electrodes. In some embodiments, the electrode can then be sized via a slitting and/or notching machine to cut the electrode into the proper size and/or shape.

In some embodiments, solid electrolyte materials of the solid electrolyte layer can include inorganic solid electrolyte materials such as oxides, sulfides, phosphides, halides, ceramics, solid polymer electrolyte materials, hybrid solid state electrolytes, or glassy electrolyte materials, among others, or in any combinations thereof. In some embodiments, the solid electrolyte layer can include a polyanionic or oxide-based electrolyte material (e.g., Lithium Superionic Conductors (LISICONs), Sodium Superionic Conductors (NASICONs), perovskites with formula $ABO_3$ (A=Li, Ca, Sr, La, and B=Al, Ti), garnet-type with formula $A_3B_2(XO_4)_3$ (A=Ca, Sr, Ba and X=Nb, Ta), lithium phosphorous oxy-nitride (LixPOyNz), among others, or in any combinations thereof. In some embodiments, the solid electrolyte layer can include a glassy, ceramic and/or crystalline electrolyte material such as $Li_3PS_4$, $Li_7P_3S_{11}$, $Li_2S$—$P_2S_5$, $Li_2S$—$B_2S_3$, $SnS$—$P_2S_5$, $Li_2S$—$SiS_2$, $Li_2S$—$P_2S_5$, $Li_2S$—$GeS_2$, lithium phosphorous oxy-nitride ($Li_xPO_yN_z$), lithium germanium phosphate sulfur ($Li_{10}GeP_2S_{12}$), Yttria-stabilized Zirconia (YSZ), NASICON ($Na_3Zr_2Si_2PO_{12}$), beta-alumina solid electrolyte (BASE), perovskite ceramics (e.g., strontium titanate ($SrTiO_3$)), Lithium lanthanum zirconium oxide ($La_3Li_7O_{12}Zr_2$), LiSiCON (Li2+2xZn1−xGeO4), lithium lanthanum titanate (Li3xLa⅔−xTiO3) and/or sulfide-based lithium argyrodites with formula $Li_6PS_5X$ (X=Cl, Br) like $Li_6PS_5Cl$, among others, or in any combinations thereof. Furthermore, solid state polymer electrolyte materials can include a polymer electrolyte material (e.g., a hybrid or pseudo-solid state electrolyte), for example, polyacrylonitrile (PAN), polyethylene oxide (PEO), polymethylmethacrylate (PMMA), and polyvinylidene fluoride (PVDF), and PEG, among others, or in any combinations thereof.

At step 803, the battery cell can be assembled. After the electrodes, separators, and/or electrolytes have been prepared, a battery cell can be assembled/prepared. In this step, the separator and/or an electrolyte layer can be assembled between the anode and cathode layers to form the internal structure of a battery cell. These layers can be assembled by a winding method such as a round winding or prismatic/flat winding, a stacking method, or a z-folding method.

The assembled cell structure can then be inserted into a cell housing which is then partially or completed sealed. In addition, the assembled structure can be connected to terminals and/or cell tabs (via a welding process). For battery cells utilizing a liquid electrolyte, the housed cell with the electrode structure inside it can also be filled with electrolyte and subsequently sealed.

Battery cells can have a variety of form factors, shapes, or sizes. For example, battery cells (and their housings/casings) can have a cylindrical, rectangular, square, cubic, flat, or prismatic form factor, among others. There are four main types of battery cells: (1) button or coin cells; (2) cylindrical cells; (3) prismatic cells; and (4) pouch cells. Battery cells can be assembled, for example, by inserting a winding and/or stacked electrode roll (e.g., a jellyroll) into a battery cell casing or housing. In some embodiments, the winded or stacked electrode roll can include the electrolyte material. In some embodiments, the electrolyte material can be inserted in the battery casing or housing separate from the electrode roll. In some embodiments, the electrolyte material includes, but is not limited to, an ionically conductive fluid or other material (e.g., a layer) that can allow the flow of electrical charge (i.e., ion transportation) between the cathode and anode. In some embodiments, the electrolyte material can include a non-aqueous polar solvent (e.g., a carbonate such as ethylene carbonate, propylene carbonate, diethyl carbonate, ethyl methyl carbonate, dimethyl carbonate, or a mixture of any two or more thereof). The electrolytes may also include other additives such as, but not limited to, vinylidene carbonate, fluoroethylene carbonate, ethyl propionate, methyl propionate, methyl acetate, ethyl acetate, or a mixture of any two or more thereof. The lithium salt of the electrolyte may be any of those used in lithium battery construction including, but not limited to, lithium perchlorate, lithium hexafluorophosphate, lithium bis(fluorosulfonyl)imide, lithium bis(trifluorosulfonyl)imide, or a mixture of any two or more thereof. In addition, the salt may be present in the electrolyte from greater than 0 M to about 5 M, or for example salt may be present between about 0.05 to 2 M or about 0.1 to 2 M.

Figure 9:
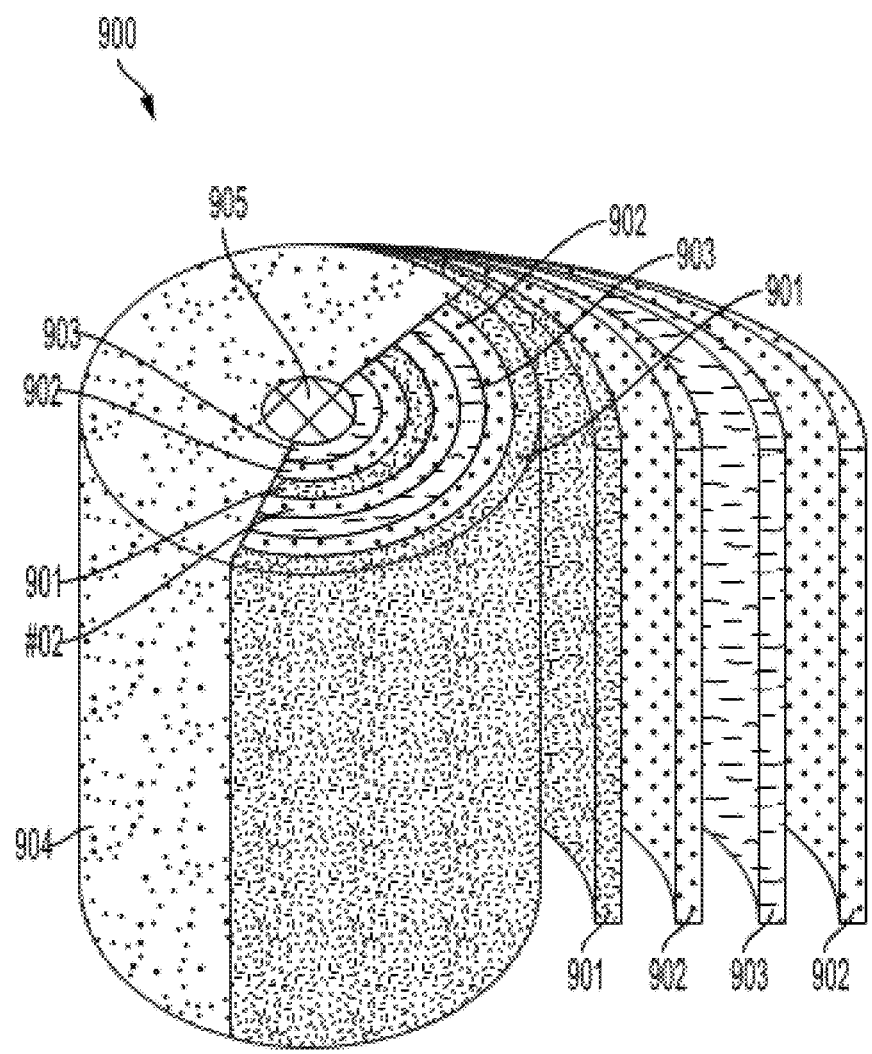
FIG. 9 depicts an illustrative example of a cross sectional view of a cylindrical battery cell, according to some embodiments.

FIG. 9 depicts an illustrative example of a cross sectional view of a cylindrical battery cell 900. The cylindrical battery cell can include layers (e.g., sheet-like layers) of anode layers 901, separator and/or electrolyte layers 902, and cathode layers 903.

A battery cell can include at least one anode layer, which can be disposed within the cavity of the housing/casing. The battery cell can also include at least one cathode layer. The at least one cathode layer can also be disposed within the housing/casing. In some embodiments, when the battery cell is discharging (i.e., providing electric current), the at least one anode layer releases ions (e.g., lithium ions) to the at least one cathode layer generating a flow of electrons from one side to the other. Conversely, in some embodiments, when the battery cell is charging, the at least one cathode layer can release ions and the at least one anode layer can receive these ions.

These layers (cathode, anode, separator/electrolyte layers) can be sandwiched, rolled up, and/or packed into a cavity of a cylinder-shaped casing 904 (e.g., a metal can). The casings/housings can be rigid such as those made from metallic or hard-plastic, for example. In some embodiments, a separator layer (and/or electrolyte layer) 902 can be arranged between an anode layer 901 and a cathode layer 903 to separate the anode layer 902 and the cathode layer 903. In some embodiments, the layers in the battery cell can alternate such that a separator layer (and/or electrolyte layer) separates an anode layer from a cathode layer. In other words, the layers of the battery electrode can be (in order) separator layer, anode/cathode layer, separator layer, opposite of other anode/cathode layer and so on. The separator layer (and/or electrolyte layer) 902 can prevent contact between the anode and cathode layers while facilitating ion (e.g., lithium ions) transport in the cell. The battery cell can also include at least one terminal 905. The at least one terminal can be electrical contacts used to connect a load or charger to a battery cell. For example, the terminal can be made of an electrically conductive material to carry electrical current from the battery cell to an electrical load, such as a component or system of an electric vehicle as discussed further herein.

Figure 10:
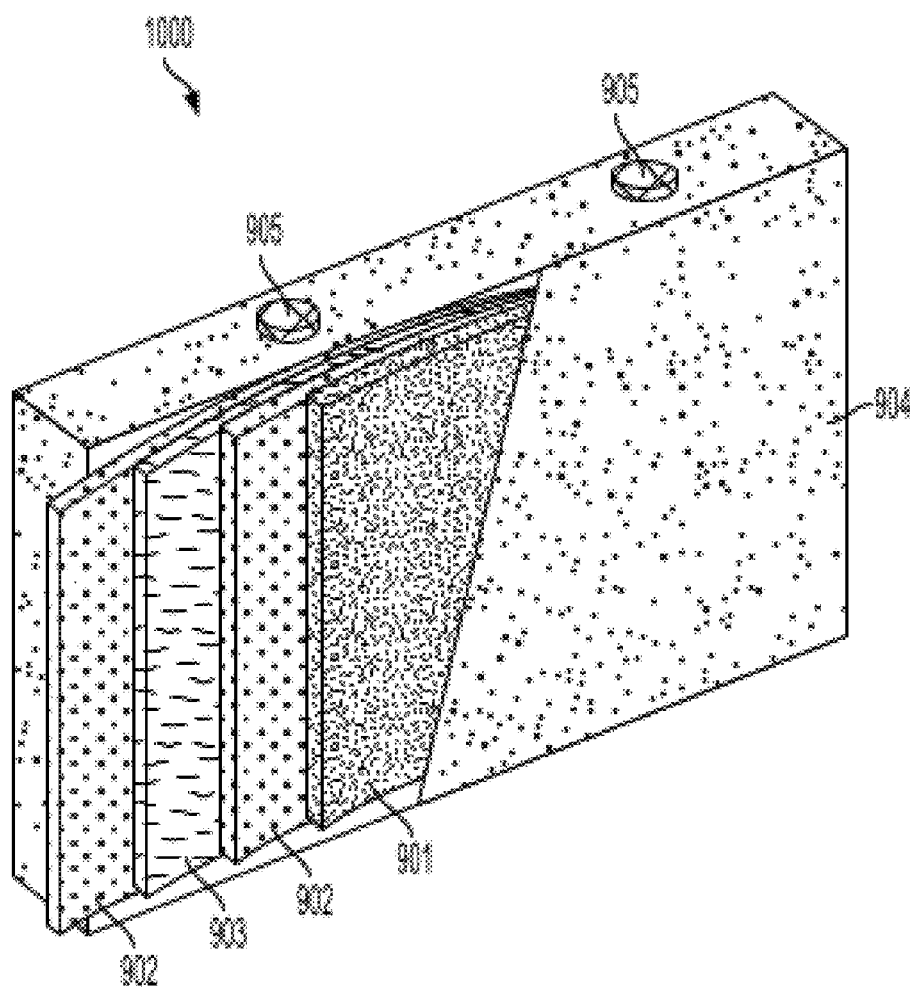
FIG. 10 depicts an illustrative example of a cross sectional view of a prismatic battery cell, according to some embodiments.

FIG. 10 depicts an illustrative example of a cross sectional view of a prismatic battery cell 1000. The prismatic battery cell can include layers (e.g., sheet-like layers) of anode layers 901, separator and/or electrolyte layers 902, and cathode layers 903. Similar to the cylindrical battery cell, the layers of a prismatic battery cell can be sandwiched, rolled, and/or pressed to fit into cubic or rectangular cuboid (e.g., hyperrectangle) shaped casing/housing 904. In some embodiments, the layers can be assembled by layer stacking rather than jelly rolling. In some embodiments, the casing or housing can be rigid such as those made from a metal and/or hard-plastic. In some embodiments, the prismatic battery cell 1000 can include more than one terminal 905. In some embodiments, one of these terminals can be the positive terminal and the other a negative terminal. These terminals can be used to connect a load or charger to the battery cell.

Figure 11:
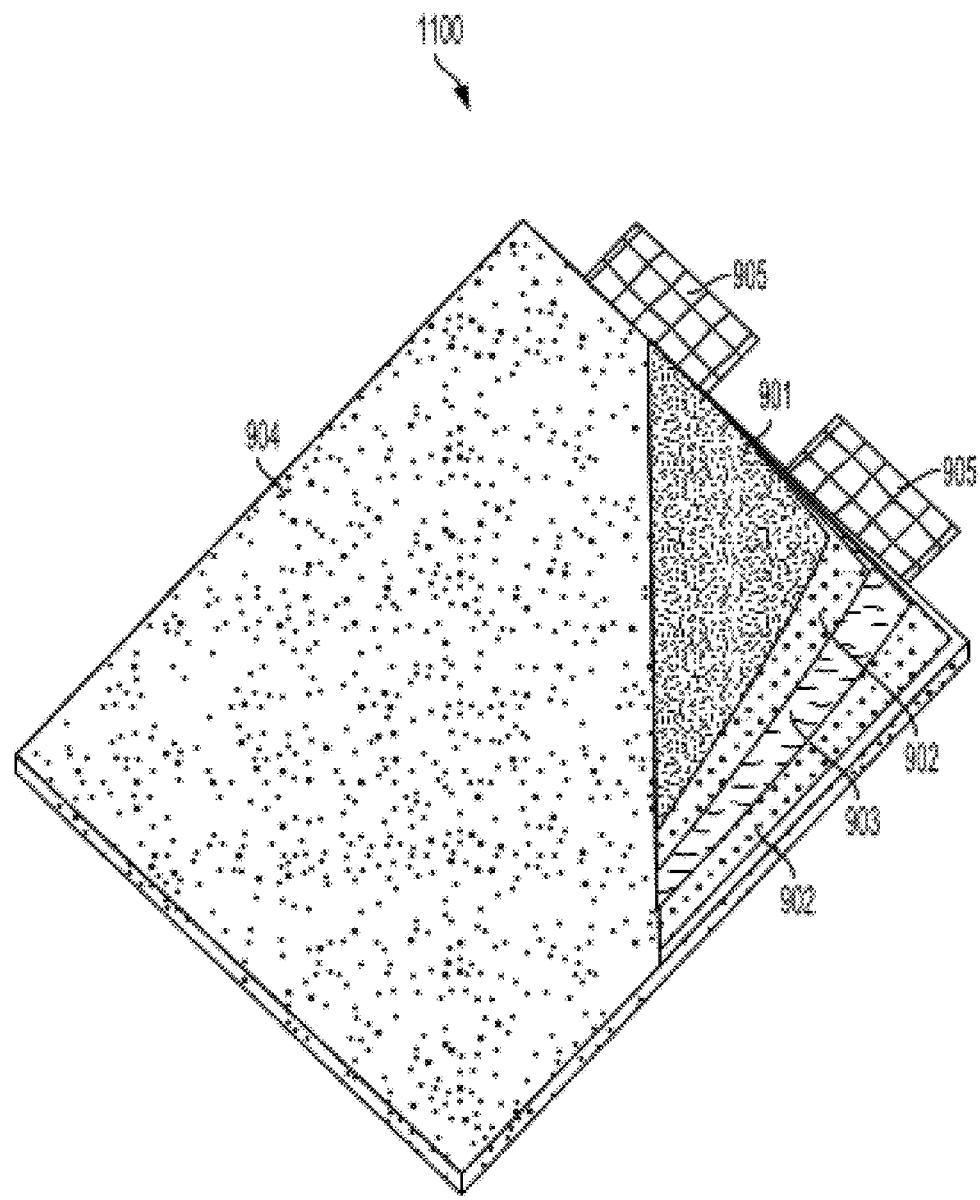
FIG. 11 depicts an illustrative example of a cross section view of a pouch battery cell, according to some embodiments.

FIG. 11 depicts an illustrative example of a cross section view of a pouch battery cell 1100. The pouch battery cells do not have a rigid enclosure and instead use a flexible material for the casing/housing 904. This flexible material can be, for example, a sealed flexible foil. The pouch battery cell can include layers (e.g., sheet-like layers) of anode layers 901, separator and/or electrolyte layers 902, and cathode layers 903. In some embodiments, these layers are stacked in the casing/housing. In some embodiments, the pouch battery cell 1100 can include more than one terminal 905. In some embodiments, one of these terminals can be the positive terminal and the other the negative terminal. These terminals can be used to connect a load or charger to the battery cell.

The casings/housings of battery cells can include one or more materials with various electrical conductivity or thermal conductivity, or a combination thereof. In some embodiments, the electrically conductive and thermally conductive material for the casing/housing of the battery cell can include a metallic material, such as aluminum, an aluminum alloy with copper, silicon, tin, magnesium, manganese, or zinc (e.g., aluminum 1000, 4000, or 5000 series), iron, an iron-carbon alloy (e.g., steel), silver, nickel, copper, and a copper alloy, among others. In some embodiments, the electrically conductive and thermally conductive material for the housing of the battery cell can include a ceramic material (e.g., silicon nitride, silicon carbide, titanium carbide, zirconium dioxide, beryllium oxide, and among others)

and/or a thermoplastic material (e.g., polyethylene, polypropylene, polystyrene, polyvinyl chloride, or nylon), among others.

At step 804, the battery cell can be finalized. In some embodiments, this step includes the formation process wherein the first charging and discharging process for the battery cell takes place. In some embodiments, this initial charge and discharge can form a solid electrolyte interface between the electrolyte and the electrodes. In some embodiments, this step may cause some of the cells to produce gas which can be removed in a degassing process from the battery cell. In some embodiments, this step includes aging the battery cell. Aging can include monitoring cell characteristics and performance over a fixed period of time. In some embodiments, this step can also include testing the cells in an end-of-line (EOL) test rig. The EOL testing can include discharging the battery cells to the shipping state of charge, pulse testing, testing internal resistance measurements, testing OCV, testing for leakage, and/or optically inspecting the battery cells for deficiencies.

Figure 12:
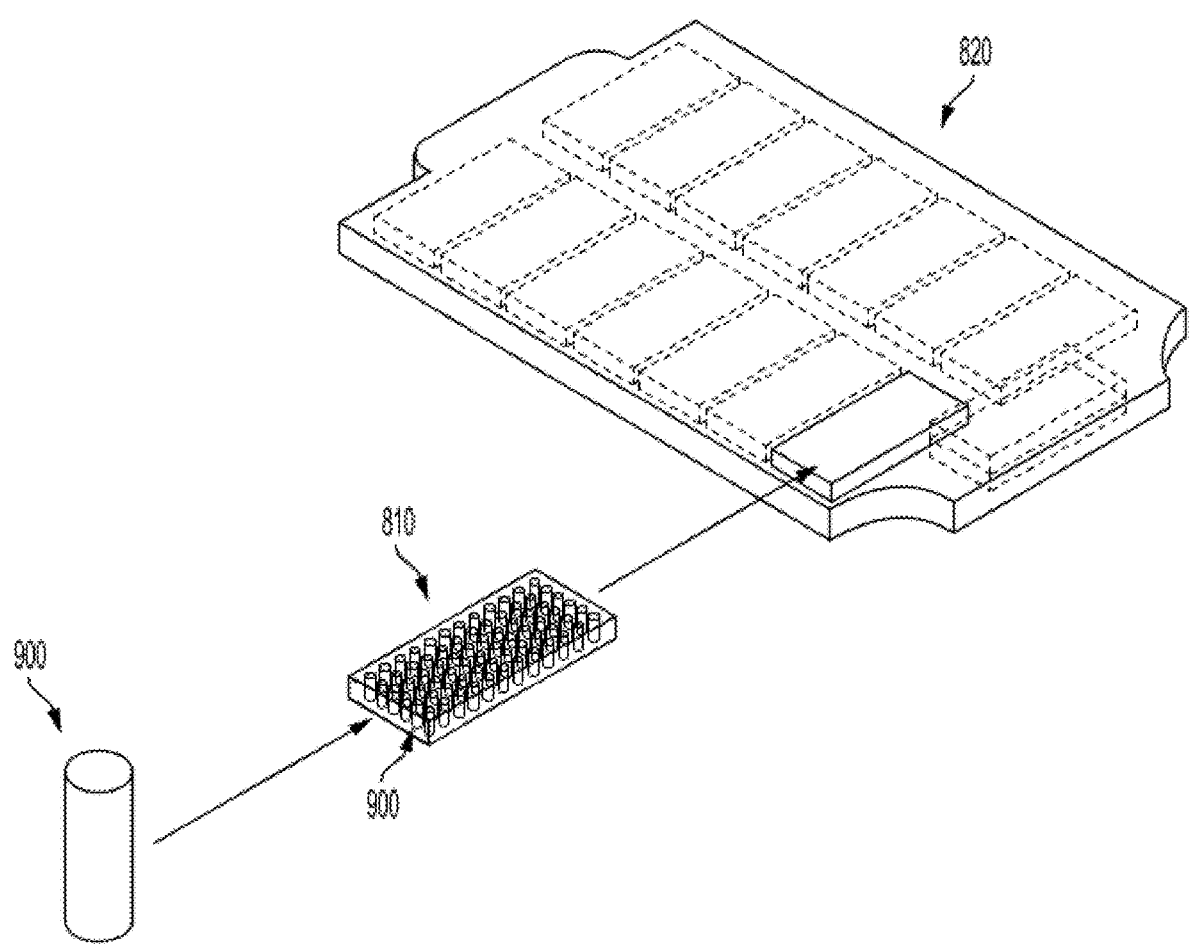
FIG. 12 illustrates cylindrical battery cells being inserted into a frame to form a battery module and pack, according to some embodiments.
Figure 13:
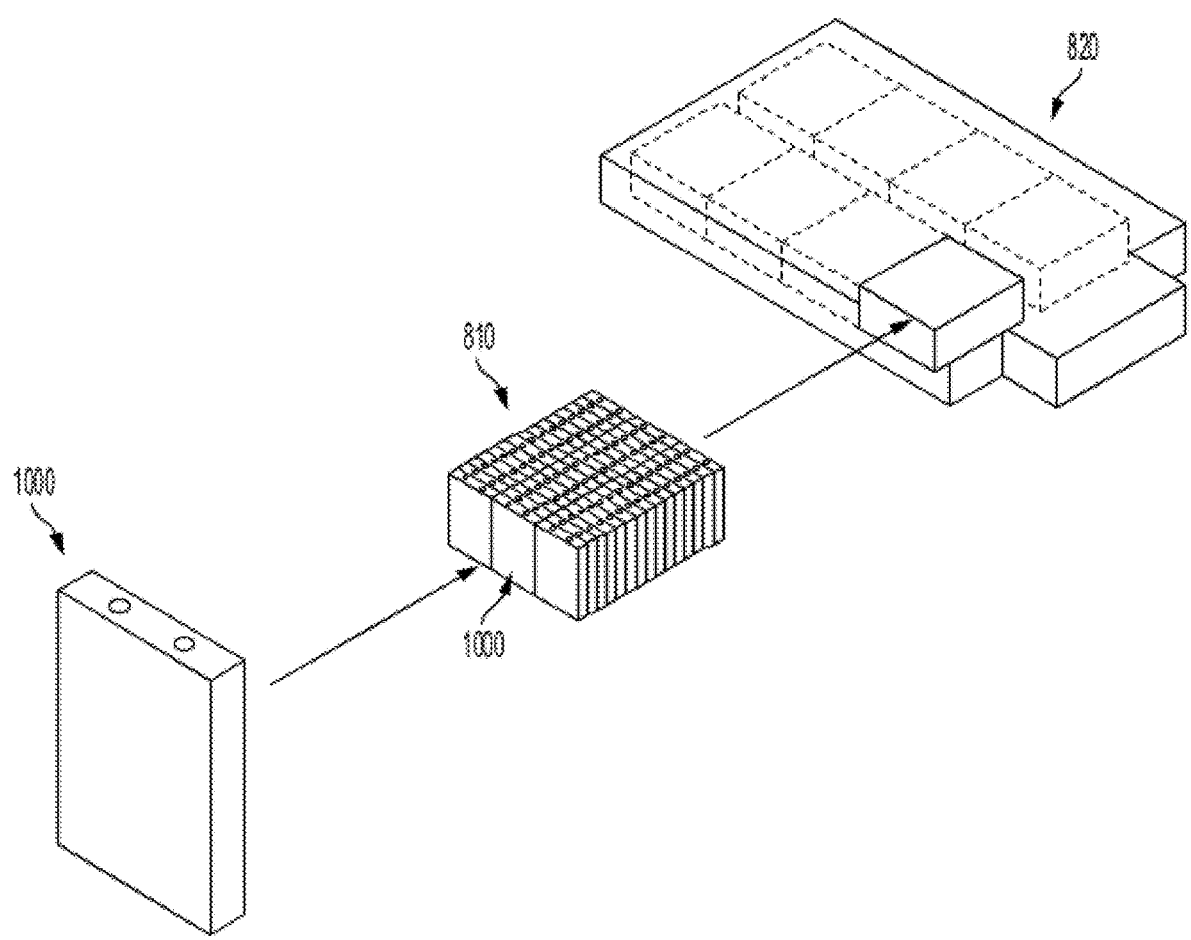
FIG. 13 illustrates prismatic battery cells being inserted into a frame to form a battery module and pack, according to some embodiments.
Figure 14:
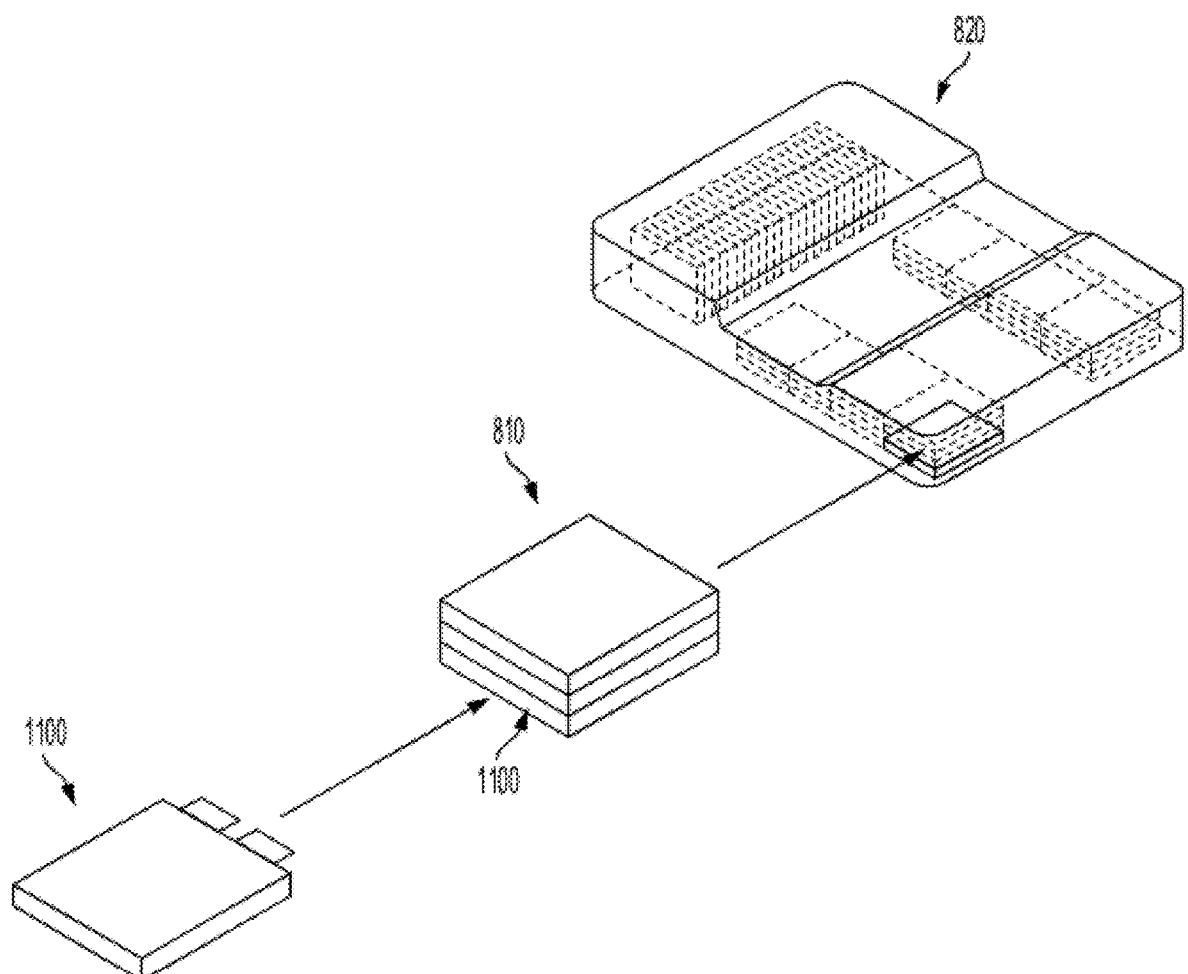
FIG. 14 illustrates pouch battery cells being inserted into a frame to form a battery module and pack, according to some embodiments.

A plurality of battery cells (900, 1000, and/or 1100) can be assembled or packaged together in the same housing, frame, or casing to form a battery module and/or battery pack. The battery cells of a battery module can be electrically connected to generate an amount of electrical energy. These multiple battery cells can be linked to the outside of the housing, frame, or casing, through a uniform boundary. The battery cells of the battery module can be in parallel, in series, or in a series-parallel combination of battery cells. The housing, frame, or casing can protect the battery cells from a variety of dangers (e.g., external elements, heat, vibration, etc.). FIG. 12 illustrates cylindrical battery cells 900 being inserted into a frame to form battery module 810. FIG. 13 illustrates prismatic battery cells 1000 being inserted into a frame to form battery module 810. FIG. 14 illustrates pouch battery cells 1100 being inserted into a frame to form battery module 810. In some embodiments, the battery pack may not include modules. For example, the battery pack can have a "module-free" or cell-to-pack configuration wherein battery cells are arranged directly into a battery pack without assembly into a module.

A plurality of the battery modules 810 can be disposed within another housing, frame, or casing to form a battery pack 820 as shown in FIGS. 12-14. In some embodiments, a plurality of battery cells can be assembled, packed, or disposed within a housing, frame, or casing to form a battery pack (not shown). In such embodiments, the battery pack may not include a battery module (e.g., module-free). For example, the battery pack can have a module-free or cell-to-pack configuration where the battery cells can be arranged directly into a battery pack without assembly into a battery module. In some embodiments, the battery cells of the battery pack can be electrically connected to generate an amount of electrical energy to be provided to another system (e.g., an electric vehicle).

The battery modules of a battery pack can be electrically connected to generate an amount of electrical energy to be provided to another system (e.g., an electric vehicle). The battery pack can also include various control and/or protection systems such as a heat exchanger system (e.g., a cooling system) configured to regulate the temperature of the battery pack (and the individual modules and battery cells) and a battery management system configured to control the battery pack's voltage, for example. In some embodiments, a battery pack housing, frame, or casing can include a shield on the bottom or underneath the battery modules to protect the battery modules from external elements. In some embodiments, a battery pack can include at least one heat exchanger (e.g., a cooling line configured to distribute fluid through the battery pack or a cold plate as part of a thermal/temperature control or heat exchange).

In some embodiments, battery modules can collect current or electrical power from the individual battery cells that make up the battery modules and can provide the current or electrical power as output from the battery pack. The battery modules can include any number of battery cells and the battery pack can include any number of battery modules. For example, the battery pack can have one, two, three, four, five, six, seven, eight, nine, ten, eleven, twelve or other number of battery modules disposed in the housing/frame/casing. In some embodiments, a battery module can include multiple submodules. In some embodiments, these submodules may be separated by a heat exchanger configured to regulate or control the temperature of the individual battery module. For example, a battery module can include a top battery submodule and a bottom battery submodule. These submodules can be separated by a heat exchanger such as a cold plate in between the top and bottom battery submodules.

The battery packs can come in all shapes and sizes. For example, FIGS. 12-14 illustrates three differently shaped battery packs 820. As shown in FIGS. 12-14, the battery packs 820 can include or define a plurality of areas, slots, holders, containers, etc. for positioning of the battery modules. The battery modules can come in all shapes and sizes. For example, the battery modules can be square, rectangular, circular, triangular, symmetrical, or asymmetrical. In some examples, battery modules in a single battery pack may be shaped differently. Similarly, the battery module can include or define a plurality of areas, slots, holders, containers, etc. for the plurality of battery cells.

Figure 15:
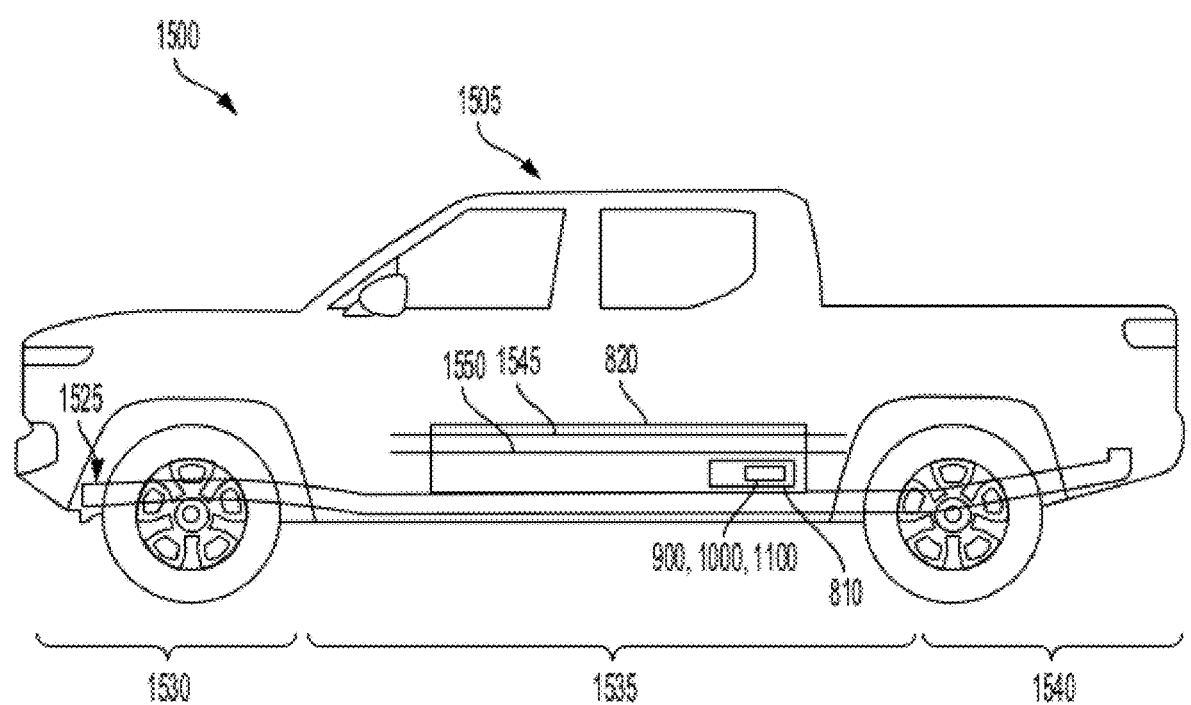
FIG. 15 illustrates an example of a cross sectional view of an electric vehicle that includes at least one battery pack, according to some embodiments.

FIG. 15 illustrates an example of a cross sectional view 1500 of an electric vehicle 1505 that includes at least one battery pack 820. Electric vehicles can include, but are not limited to, electric trucks, electric sport utility vehicles (SUVs), electric delivery vans, electric automobiles, electric cars, electric motorcycles, electric scooters, electric passenger vehicles, electric passenger or commercial trucks, hybrid vehicles, or other vehicles such as sea or air transport vehicles, planes, helicopters, submarines, boats, or drones, among other possibilities. Electric vehicles can be fully electric or partially electric (e.g., plug-in hybrid) and further, electric vehicles can be fully autonomous, partially autonomous, or unmanned. In addition, electric vehicles can also be human operated or non-autonomous.

Electric vehicles 1505 can be installed with a battery pack 820 that includes battery modules 810 with battery cells (900, 1000, and/or 1100) to power the electric vehicles. The electric vehicle 1505 can include a chassis 1525 (e.g., a frame, internal frame, or support structure). The chassis 1525 can support various components of the electric vehicle 1505. In some embodiments, the chassis 1525 can span a front portion 1530 (e.g., a hood or bonnet portion), a body portion 1535, and a rear portion 1540 (e.g., a trunk, payload, or boot portion) of the electric vehicle 1505. The battery pack 820 can be installed or placed within the electric vehicle 1505. For example, the battery pack 820 can be installed on the chassis 1525 of the electric vehicle 1505 within one or more of the front portion 1530, the body portion 1535, or the rear portion 1540. In some embodiments, the battery pack 820 can include or connect with at least one busbar, e.g., a current collector element. For example, the first busbar 1545 and the second busbar 1550 can include electrically conductive material to connect or otherwise electrically couple the battery pack 820 (and/or battery modules 810 or the battery cells 900, 1000, and/or 1100) with other electrical components of the electric vehicle 1505 to provide electrical power to various systems or components of the electric vehicle 1505. In some embodiments, battery pack 820 can also be used as an energy storage system to power a building, such as a residential home or commercial building instead of or in addition to an electric vehicle.

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

Reference to "about" a value or parameter herein includes (and describes) variations that are directed to that value or parameter per se. For example, description referring to "about X" includes description of "X". In addition, reference to phrases "less than", "greater than", "at most", "at least", "less than or equal to", "greater than or equal to", or other similar phrases followed by a string of values or parameters is meant to apply the phrase to each value or parameter in the string of values or parameters.

This application discloses several numerical ranges in the text and figures. The numerical ranges disclosed inherently support any range or value within the disclosed numerical ranges, including the endpoints, even though a precise range limitation is not stated verbatim in the specification because this disclosure can be practiced throughout the disclosed numerical ranges.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A method of forming a graphite material comprising:
    integrating a graphite precursor material with a seed material, which is selected from graphene, carbon nanotubes, silicon-containing material, or a combination thereof, to form a graphite precursor composite; and
    graphitizing the graphite precursor composite to form the graphite material comprising the seed material embedded within the graphite.

2. The method of claim 1, wherein integrating the seed material into the graphite precursor material comprises exfoliating and dispersing graphene into the graphite precursor material.

3. The method of claim 2, wherein exfoliating and dispersing comprises solid-state shear or twin-screw shear pulverization of graphene and the graphite precursor material.

4. The method of claim 1, further comprising integrating a silicon-containing material into the graphite precursor material to form the graphite precursor composite.

5. The method of claim 1, wherein graphitizing the graphite precursor composite is in an inductive furnace.

6. The method of claim 1, further comprising coating the graphite with a first coating comprising a carbon material.

7. The method of claim 6, wherein the first coating further comprises at least one selected from the group consisting of an electrically conductive material, a solid-electrolyte interface (SEI) former, a MAX component, and a lithiophilic compound.

8. The method of claim 6, further comprising coating the graphite with a second coating comprising at least one selected from the group consisting of an electrically conductive material, a solid-electrolyte interface (SEI) former, a MAX component, and a lithiophilic compound.

9. The method of claim 1, wherein the seed material comprises graphene.

10. The method of claim 1, wherein the seed material comprises carbon nanotubes.

11. The method of claim 1, wherein the graphite material has a graphitization degree of at least 80%.

12. The method of claim 1, wherein the graphite material has a specific surface area of less than 10 $m^2/g$.

* * * * *

UNITED STATES PATENT AND TRADEMARK OFFICE
CERTIFICATE OF CORRECTION

| | | |
|---|---|---|
| PATENT NO. | : 12,371,330 B2 | Page 1 of 1 |
| APPLICATION NO. | : 18/145752 | |
| DATED | : July 29, 2025 | |
| INVENTOR(S) | : Cary Michael Hayner et al. | |

It is certified that error appears in the above-identified patent and that said Letters Patent is hereby corrected as shown below:

In the Claims

Column 18, Line 23 (Claim 1): Replace "within the graphite.", with --within a graphite.--.

Signed and Sealed this
Ninth Day of December, 2025

John A. Squires
*Director of the United States Patent and Trademark Office*